SEMI-CONDUCTOR PHASE CONTROLLED OSCILLATOR CIRCUITS

Filed Aug. 23, 1954 2 Sheets-Sheet 1

INVENTOR.
GERALD B. HERZOG
BY H. O. Newton
ATTORNEY

Oct. 23, 1956 G. B. HERZOG 2,768,296

SEMI-CONDUCTOR PHASE CONTROLLED OSCILLATOR CIRCUITS

Filed Aug. 23, 1954 2 Sheets-Sheet 2

INVENTOR.
GERALD B. HERZOG

BY H. D. Newton

ATTORNEY 2,768,296

SEMI-CONDUCTOR PHASE CONTROLLED OSCILLATOR CIRCUITS

Gerald B. Herzog, Princeton, N. J., assignor to Radio Corporation of America, a corporation of Delaware Application August 23, 1954, Serial No. 451,415
16 Claims. (Cl. 250—36)

This invention relates in general to phase controlled oscillator circuits, and in particular to transistor oscillator circuits of that type capable of providing synchronous operation with a reference wave in television receivers and the like.

In one commercial color television system the side bands of a subcarrier wave, which is both phase and amplitude modulated in accordance with the color information of a subject, are interspersed with the video signals representing brightness of the subject. By properly choosing the frequency of the color subcarrier wave, the color signal modulated side band energy components may be made to fall between the brightness signal energy components.

In systems of this type the color information is derived at a receiver by synchronously demodulating the color subcarrier wave. Such demodulation is effected under the control of a reference frequency oscillator operating in synchronism and in definite phase relation with the received phase and amplitude modulated color subcarrier wave.

For the synchronization of the receiver color subcarrier wave with the reference frequency oscillator, it is the usual practice to transmit a composite signal which includes, in addition to the video signals comprising the brightness and color information, the usual horizontal and vertical synchronizing signals and also bursts of several cycles each of the color subcarrier wave frequency respectively following the horizontal synchronizing signals. Such a color synchronizing system is described in a publication entitled "Recent Developments in Color Synchronization in the RCA Color Television System" issued by the Radio Corporation of America, February 1950.

The demodulation of the color subcarrier wave and its side bands, as previously mentioned, is performed along definite axes or phases. Since the accuracy of these phases will determine the accuracy of the hue of the color information ultimately applied to the kinescope, information must be transmitted with the composite signal which establishes a reference phase. This color synchronizing information, which is referred to as the "burst," is extracted from the composite signal and used to establish a pair of continuous wave signals whose phase corresponds to the so-called I and Q axes. These continuous wave signals are used in a pair of synchronous detector circuits whose outputs are the I and Q signals in the present type of color television receiver.

These continuous wave signals as referred to above may be obtained in a number of different ways. One method is to use a crystal oscillator whose exact frequency is determined by a reactance tube. The reactance tube is controlled by an error signal proportional to the difference in phase between the incoming synchronization information and the oscillator output. The reactance tube tends to load down the oscillator, however, and is often subject to relatively unstable operation.

The development of commercially useful transistors has had a pronounced effect upon and has caused the introduction of many new techniques in the electronic signal communication field, including television receiving apparatus. Transistors have many advantages including their small size and durability, especially when compared with the ordinary vacuum tube. In addition, they require no heater power and consist of materials which appear to have a long useful life. Consequently, the use of transistors in television signal receiving circuits and other electrical circuits has been, and is, the subject of extensive investigation. Thus, the present invention is directed to circuit means utilizing transistors for performing the functions required for color synchronization in color television receiving systems as described hereinbefore.

It is, accordingly, an object of the present invention to provide an improved phase controlled oscillator circuit utilizing transistors for stable and efficient operation and which is suitable for color synchronization in color television receiving systems.

It is another object of the present invention to provide an improved automatic frequency control system for color television receivers to effect simple and efficient synchronization of a color subcarrier reference frequency oscillator circuit which utilizes transistors.

It is a further object of the present invention to provide an improved and stable transistor oscillator circuit which may effectively be locked in from information received in the form of a burst of information and which effectively remains locked in until receipt of the next burst of information.

These and further objects and advantages of the present invention are achieved, in general, by varying the input and output capacities of a transistor in an oscillator circuit in response to the application of an error or control signal. The error or control signal is derived by comparing the information in the burst with a portion of the output energy of the reference frequency oscillator. In one aspect of the invention the error signal is applied to a transistor which comprises a portion of a voltage dividing network. When the error signal is applied, the conductivity of the transistor is changed which in turn is used to vary the input and output capacity of a transistor in an oscillator circuit. In another aspect the control or error signal is used to vary the conductivity of a pair of opposite conductivity transistors connected for push-pull operation. The changes in conductivity of the push-pull stage are then used to vary the input and output capacities of a transistor in an oscillator circuit.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

In television systems of the type in which this invention may find its widest application, video information is transmitted during recurring intervals. Scanning control signals and blanking signals are transmitted inbetween these intervals. A horizontal sync pulse is superimposed upon a blanking pulse. That portion of the blanking pulse which follows the superimposed horizontal sync pulse is conventionally termed the "back porch." This term will be used for the sake of brevity and convenience. In accordance with the present NTSC standards, for example, a sampling control signal of an appropriate frequency is transmitted during this back porch interval. That is to say, it follows a sync signal but occurs during blanking. At the receiver the sampling control signal occurring during the back porch interval is used to control the phase and frequency of the reference frequency oscillator. In this way, extremely stable synchronization can be obtained between the sampling at the receiver and the sampling at the transmitter in such a manner as to not interfere with the normal operation of the television receiver.

Figures 1, 2:
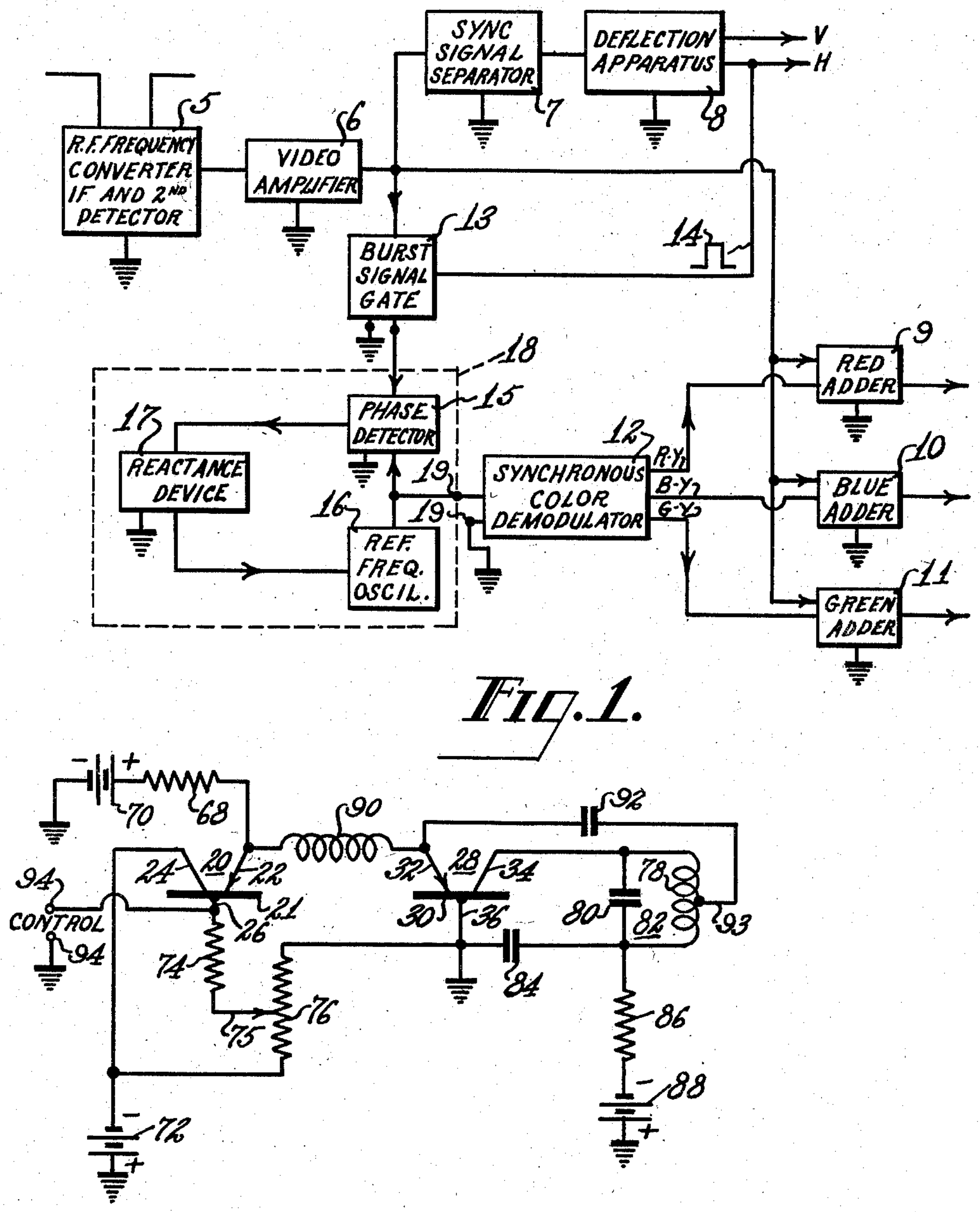
Figure 1 is a system diagram in block form, of those portions of a color television receiver which relate to the color information of the received signal and illustrate the operation of the invention in connection therewith.
Figure 2 is a schematic circuit diagram of a phase controlled oscillator circuit, which is adapted for use in the system of Figure 1, in accordance with the present invention.

Referring now to the drawing, wherein like parts are indicated by like reference numerals and referring particularly to Figure 1, a conventional television tuner 5 is provided for receiving and demodulating a transmitted television carrier wave, and may comprise a carrier wave or radio frequency amplifier circuit, a frequency converter circuit, an intermediate frequency amplifier circuit and a second detector circuit. Accordingly, the composite television signal which includes a video signal having both brightness information and color information of a subject in the form of a phase and amplitude modulated subcarrier wave is recovered from the carrier wave signal. The composite signal has a nominal frequency which is substantially equal to one of the higher brightness component frequencies. The composite signal will, it should be understood, also include the usual horizontal and vertical signals for maintaining synchronous operation of the receiver deflection apparatus with that of the transmitter. In addition, the composite signal will also include a burst of several cycles of the color subcarrier wave frequency superimposed substantially on the back porch of the horizontal synchronizing signals. The composite signal which has been derived from the television carrier wave by the circuits in the television tuner 5 is coupled in the usual manner to a conventional video amplifier 6 which is provided to further amplify the composite signal.

The information necessary for the coordinated operation of the various circuits of the television receiving system is derived from the output of the video amplifier 6 by means of frequency selective circuits. Accordingly, the synchronization signals which are necessary for the proper synchronization or timing of the deflection apparatus, are coupled from the output of the video amplifier 6 to the input of the sync signal separation apparatus 7. The sync signal separation apparatus is in turn coupled to the deflection apparatus 8 for proper placement of the eelctron beam on the face of the kinescope in synchronism with the scanning of the subject at the transmitter. Luminance information is passed from the composite signal output of the video amplifier 5 and applied to the color matrix comprising the red adder 9, the blue adder 10 and the green adder 11 each represented in block diagram for the sake of simplicity.

Chrominance information is derived from the composite signal by means of two or three synchronous color demodulators illustrated as a single block 12 containing the legent "Synchronous Color Demodulators." For simplicity sake this has been shown as a single block. However, in practice this block will contain a pair of synchronous demodulators. The synchronous demodulators are utilized to compare the information received from the composite signal with information received from a reference frequency oscillator which will be discussed more fully hereinafter.

Color synchronization to which this invention appertains is derived by means of a burst signal gate 13 which as illustrated is gated by the application of a horizontal deflection pulse illustrated as a wave form 14 delayed and applied from the output of the deflection apparatus 8 to the burst signal gate 13. Accordingly, the burst signal gate 13 is triggered by the horizontal deflection pulse 14 which permits the passage of information from the output of the video amplifier 5 to the phase detector 15 at the instant when the burst information is available in the composite signal.

A reference frequency oscillator is normally provided for color synchronization which is designed to operate at the frequency of the color subcarrier wave. The output of this oscillator, however, must be precisely controlled to be in phase or cophasal with the information contained in the burst. Accordingly, a portion of the output energy of the reference frequency oscillator 16 is applied also to the phase detector 15. In this manner the information contained in the burst is compared with the output of the reference frequency oscillator and a corrective voltage is applied to a reactance device 17. As is usual with conventional oscillator circuits, the reactance device is adapted to vary the frequency of the reference frequency oscillator to correct for any phase difference that might exist between the information contained in the burst and the output of the reference frequency oscillator 21.

The output of the reference frequency oscillator 16 is also applied to the synchronous color demodulators 12 to determine the axes or phases along which demodulation occurs. Since the accuracy of these phases will determine the accuracy of the hue of the color information ultimately applied to the kinescope, it is readily understood that precise control of the reference frequency oscillator is necessary. The phase detector 15, the reactance device 17 and the reference frequency oscillator 16 form what is normally considered a part of the color synchronization channel in a color television receiver and is called the color hold circuit, which in Figure 1 has been included within the dotted rectangle 18.

In accordance with the teachings of the present invention, transistor circuits have been provided to perform the functions required for color synchronization in color television receiving systems as described above. This is accomplished, in general, in accordance with the present invention, by varying the input and output capacities of a transistor oscillator circuit in response to the application of an error or control signal. One method of accomplishing this in accordance with the invention is illustrated by the circuit shown in Figure 2 of the drawing, reference to which is now made.

In Figure 2, a pair of transistors 20 and 28 are provided, each of which may be, for example, junction transistors of the same conductivity type, in this case P-N-P junction transistors. It should be understood that throughout the description the specific type of transistors used is by way of example only and other types having similar characteristics would be equally appropriate. Moreover, the invention is not restricted to any one specific conductivity type of transistor, and transistors of opposite conductivity type to those illustrated could be used by making the appropriate changes in the polarity of the biasing supply means.

The control transistor 20 provides a variable impedance means for the circuit and includes a semi-conductive body 21 and three electrodes which are cooperatively associated therewith in a well known manner. These electrodes have been designated, as is conventional, as an emitter 22, a collector 24 and a base 26. To provide proper emitter biasing potentials for the transistor 20 and to further provide voltage dividing action for proper control of the emitter voltage of the transistor 28, the emitter 22 of the transistor 20 is connected through a resistor 68 to the positive terminal of a biasing battery 70, the negative terminal of which is grounded as shown. Collector biasing potentials are obtained by connecting the collector 24 of the transistor 20 directly to the negative terminal of a further biasing battery 72, the positive terminal of which is grounded. Adjustable base biasing voltages are also provided by connecting the base 26 of the transistor 20 through a tap 75 of a variable resistor or potentiometer 76 to the negative terminal of the biasing battery 72.

The polarity of the biasing voltages for the control transistor 20 will thus be recognized as being normal for a P–N–P junction transistor. That is, the emitter 22 is referred to as being biased in the relatively conducting or forward direction with respect to the base 26. The collector 24 of the transistor 20, on the other hand, is referred to as being biased in the relatively non-conducting or reverse direction with respect to the base 26.

The transistor 28 is the active element of an oscillator circuit and includes a semi-conductive body 30 which has three electrodes cooperatively associated therewith in a well known manner. These, as is conventional, are designated as an emitter 32, a collector 34 and a base 36. An inductor 78 and a capacitor 80 are arranged as a parallel resonant or frequency determining tank circuit 82 which is tuned to the center frequency of the oscillatory energy to be generated and is coupled to the collector 34 of the transistor 28. The lower end of the parallel resonant circuit 82 is coupled through a capacitor 84 to the base 36 of the transistor 28, which is connected to a point of fixed reference potential or ground for the system as shown.

Collector biasing potential for the transistor 28 is obtained by connecting the collector 34 through the inductor 78 of the tank circuit 82 and a resistor 86 to the negative terminal of a biasing battery 88, the positive terminal of which is grounded as shown. To provide a direct current conductive path between the respective emitters 22 and 32 of the transistors 20 and 28 in accordance with the invention, and further to provide proper emitter biasing of the transistor 28, the emitter 32 is connected through a radio frequency choke coil 90 to the emitter 22, and hence through the voltage dividing resistor 68 to the positive terminal of the biasing battery. It should be understood that the transistor 20 may be replaced by a transistor of an opposite conductivity type, that is an N–P–N junction transistor, for example. In this case, however, the collector of the N–P–N transistor would be coupled through the choke coil 90 to the emitter 32.

The polarity of the biasing voltages for the transistor 28 will thus be recognized as being similar to those for the transistor 20 and are normal for a P–N–P junction transistor. That is, the emitter 32 is referred to as being biased in the relatively conducting or forward direction with respect to the base 36. The collector 34 of the transistor 28, on the other hand, is referred to as being biased in the relatively non-conducting or reverse direction with respect to the base 36.

Proper feedback for sustained oscillation of the oscillator circuit is provided by a coupling capacitor 92 which is connected between a tap 93 on the inductor 78 of the tank circuit 82 and the emitter 32 of the transistor 28. Thus a regenerative feedback path is provided between the output or collector circuit and the input or emitter circuit of the transistor 28. The oscillator portion of the circuit illustrated in Figure 2 is thus seen to operate in the manner of a conventional junction transistor oscillator circuit. That is, the parallel resonant circuit 82 comprising the inductor 78 and the capacitor 80 determines the operating frequency of the oscillator. Energy is fed back from the output circuit by means of the capacitor 92 to the emitter 32 of the transistor 28. This feedback energy is provided in phase and magnitude, through the coupling shown, to overcome the losses in the circuit and thus sustain continuous oscillation.

Further in accordance with the invention a control or error signal is applied to the base 26 of the transistor 20. This is accomplished through a pair of terminals 94, one of which is grounded and the other of which is connected directly with the base 26. This control or error signal may be derived, for example, by comparing a portion of the output energy of the oscillator portion of the circuit with the information contained in the burst. In this manner a corrective voltage is obtained which may be applied to the transistor 20.

In operation, the control transistor 20 and the resistor 68 form a voltage dividing circuit or network between the positive terminal of the biasing battery 70 and the negative terminal of the biasing battery 72. Thus, by proper adjustment of the biasing potentials on the electrodes of the transistor 20, which is accomplished by adjusting the tap 75 on the variable resistor 76, the direct current voltage at the emitter 32 of the transistor 28 will be such that the correct nominal operating bias voltage is provided for the transistor 28. When, however, a control signal is applied to the base 26 of the transistor 20, its conductivity will change, thus changing the direct current voltage on the emitter 32 of the transistor 28. Accordingly, the current into the emitter 32 will change.

A change in the emitter current of the transistor 28 will also change the input capacity of the transistor 28. When the input capacity of the transistor 28 changes, the frequency or phase of the output oscillatory energy will also change. A change in emitter current of the transistor 28 will also cause the voltage drop across the resistor 86 to change, which in turn will change the direct current collector voltage of the transistor 28. A change in the collector voltage will also change the output or collector capacity. This change in collector capacity will also change the oscillator frequency or phase in the same direction as the change in the input capacity. In this manner the phase or frequency of the transistor oscillator circuit is varied in accordance with the invention to correct for any phase difference that might exist between the information contained in the burst and the output of the oscillator.

As a specific example of this type operation, assume that the control or error signal which is applied to the base 26 of transistor 28 is such that the current into the emitter 32 of the transistor 28 increases (i. e., the control or error signal is positive). An increase of this emitter current will increase the input capacity of the transistor 28. An increase in the input capacity of the transistor 28 will, in turn, decrease the frequency of oscillation. At the same time an increase in current will cause the voltage drop across the resistor 86 to increase. This will decrease the voltage on the collector 34. By lowering the collector voltage, however, the collector capacity will be increased which will also decrease the frequency of oscillation.

Figure 3:
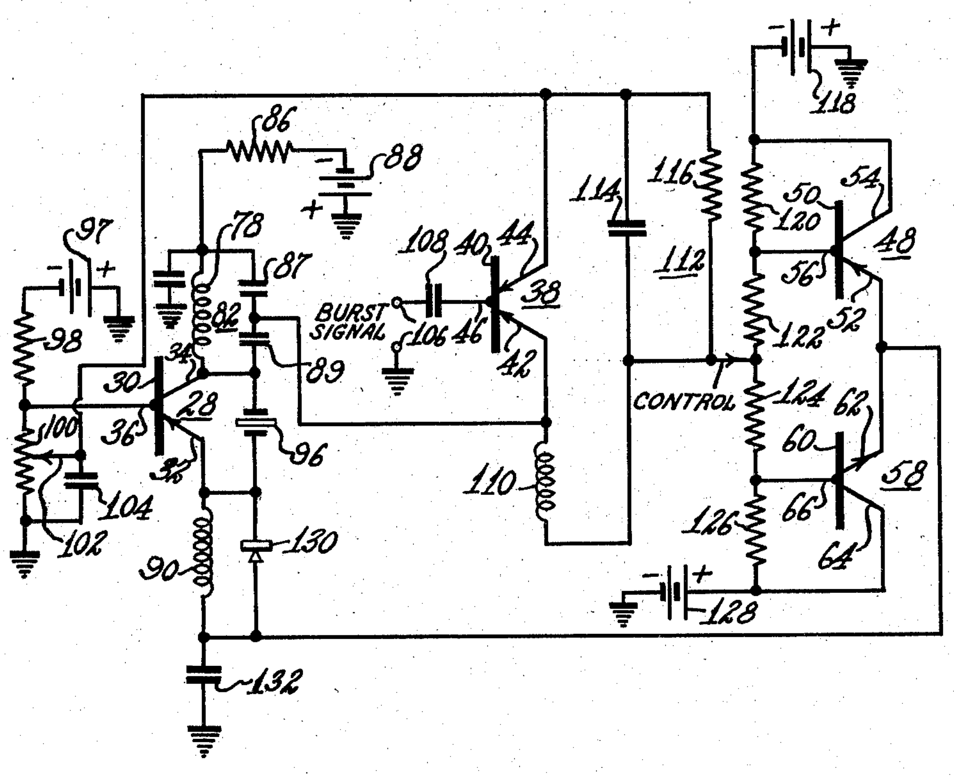
Figure 3 is a schematic circuit diagram of a semi-conductor phase controlled oscillator circuit illustrating a further embodiment of the present invention.

In Figure 3, a complete color hold circuit of a type which will perform the same function as the one included within the dotted rectangle 18 in Figure 1 comprises in general an oscillator circuit which includes the transistor 28, a phase detector which comprises a transistor 38 of the so-called symmetrical type and a push-pull amplifier control stage which includes a pair of transistors 48 and 58 of opposite conductivity types. This circuit, in accordance with the teachings of the present invention, is adapted to perform the functions of oscillation, phase detection and frequency or phase control of the oscillator circuit.

The oscillator circuit in Figure 3, which includes the transistor 28, is of the same general type as the oscillator circuit which is illustrated in Figure 2 and described in connection therewith. Thus, it includes a frequency determining tank circuit 82 which is connected with the collector 34 of the transistor. The tank circuit includes, however, a pair of capacitors 87 and 89, and a portion of the oscillator energy is taken from the junction of these capacitors which form a voltage divider network. This energy is applied to the phase detector transistor 38 where it is compared with the burst information. In addition, proper feedback for sustained oscillation is provided by a regenerative feedback path from the collector 34 to the emitter 32 of the transistor 28 through a piezoelectric crystal 96.

Base biasing voltages for the transistor 28 as well as the push-pull transistors 48 and 58 and biasing voltage for the electrode 44 of the phase detector transistor 38 are obtained from a battery 97, the positive terminal of which is grounded as shown. The negative terminal of the biasing supply battery 97 is connected through a voltage dividing network comprising a pair of series resistors 98 and 100 to ground. The resistor 100 in combination with a tap 102 comprise a voltage dividing potentiometer. The base 36 of the transistor is connected directly to the junction of the resistors 98 and 100 of the voltage dividing network. The polarity of the biasing voltages for the transistor 28 in Figure 3 will thus be recognized as being substantially identical to that of the transistor 28 in Figure 2.

The tap 102 on the resistor 100 is connected directly with the electrode 44 of the symmetrical transistor phase detector 38 and supplies a negative biasing voltage thereto. While a negative bias voltage is applied to the electrode 44 it should be understood that the operation of the phase detector transistor 38 is, in general, primarily dependent on the alternating current signals which are applied to it and no direct current biasing voltages are needed for its proper operation. Accordingly, in the present example, the alternating current signals (oscillator and burst signals) which are applied to the transistor 38 will be considerably larger than the direct current biasing voltage which is applied to the transistor 38.

The transistor 38 is designated as being symmetrical by virtue of the fact that it utilizes to advantage the property of a junction transistor whereby, under appropriate conditions, current may be caused to flow in either direction through the emitter-collector path of the transistor. In other words the transistor phase detector 38 relies upon the bidirectional current characteristics of junction transistors. Thus, in view of the bidirectional character of the current flow through the emitter-collector path of the transistor 10 it will be appreciated that the designation of the electrode 42 as the emitter or the electrode 44 as the collector is, initially, arbitrary.

In the present example, however, it will be assumed that the semi-conductive body 40 of the phase detector transistor 38 is of the P–N–P type and that the applied biasing potential is of such a polarity that the electrode 44 can be designated as a collector and the electrode 42 can be designated as an emitter. This designation, it should be understood, is not intended to be restrictively indicative of the respective functions of these two electrodes. Because of the symmetrical characteristics of the transistor 38, therefore, both of the electrodes 42 and 44 have been designated by arrows, signifying that either element can serve as the emitter or the collector, depending on the polarity of the applied potentials.

Burst information is applied to the base 46 of the transistor phase detector 38. To this end, a pair of terminals 106 are provided, one of which is grounded as shown and the other of which is connected through a coupling capacitor 108 to the base 46 of the transistor phase detector 38.

The output circuit for the transistor phase detector 38 which is connected with the collector electrode 44 comprises a filter circuit 112 which includes the parallel RC combination of a capacitor 114 and a resistor 116. A radio frequency choke coil 110 is connected between the emitter 42 of the transistor 38 and the other end of the filter circuit 112. Voltage bursts which are produced as a result of the comparison of the oscillator signal with the burst information are thus integrated by the RC filter network 112 to provide a direct current control signal which is applied through a pair of resistors 122 and 124 to the base electrodes 56 and 66 respectively of the transistors 48 and 58 of the push-pull amplifier stage. The junction of the resistors 122 and 124 is connected through the radio frequency choke coil 110 to the emitter 42 of the transistor phase detector 38.

The push-pull amplifier control stage, which includes the control transistors 48 and 58 is of the so-called common emitter configuration. The transistor 48 is illustrated as being of the P–N–P junction type and includes a semi-conductive body 50, and three electrodes which are cooperatively associated therewith in a well known manner. These electrodes are designed as an emitter 52, a collector 54 and a base 56. The transistor 58, on the other hand, is of the opposite conductivity type to the transistor 48, that is, the transistor 58 is of the N–P–N junction type. The transistor 58 includes a semi-conductive body 60 and three electrodes which are cooperatively associated therewith and are designated as an emitter 62, a collector 64 and a base 66. It should be understood, however, that the conductivity of either transistor may be reversed, so long as each is of an opposite conductivity type to the other.

To provide proper biasing potentials for the electrodes of the P–N–P junction transistor 48, a biasing battery 118 is provided, the positive terminal of which is grounded as shown. The negative terminal of this battery is connected through a resistor 120 to the base 56 of the transistor 48 and is also connected directly to the collector 54 of the transistor 48. To supply proper biasing voltages for the N–P–N junction transistor 58, a biasing battery 128 is provided, the negative terminal of which is grounded as shown. The positive terminal of the battery 128 is connected directly with the collector 64 of the transistor 58 and through a resistor 126 to the base 66 of the transistor 58. The emitters 52 and 62 are directly connected together as shown. Base biasing potential for the transistors 48 and 58, as described above, is provided by the connection to the battery 97 and may be varied by varying the position of the tap 102 on resistor 100.

As thus described, the polarity of the biasing voltages for each of the transistors 48 and 58 will be recognized as being proper for the amplifying action of transistors of their respective conductivity types. Accordingly, each of the collector electrodes 54 and 64 will be referred to as being biased in the relatively non-conducting or reverse direction with respect to the respective base electrodes 56 and 66. The emitter electrodes 52 and 62, on the other hand, of the transistors 48 and 58 respectively will be referred to as being biased in the relatively conducting or forward direction with respect to the base electrodes 56 and 66 respectively.

The common emitter electrodes 52 and 62 are connected through a radio frequency choke coil 90 to the emitter 32 of the oscillator transistor 28. To by-pass radio frequency signals to ground a by-pass capacitor 132 is connected from the lower end of the choke coil 90 to ground. To prevent self-bias from building up due to the emitter rectification of transistor 28, in accordance with another feature of the present invention, a diode 130 is connected across the choke coil 90.

In operation, oscillator signals are taken from the junction of the capacitive voltage dividing network comprising the capacitors 87 and 89 in the frequency determining circuit 82 of the oscillator and applied to the phase detector transistor 38. Signals corresponding to the burst information or signal, as described hereinbefore, are also applied to the phase detector transistor 38, in this case through the coupling capacitor 108 to the base 46 of the phase detector transistor 38. The burst signal is thus compared with the oscillator signal.

When the potential at the base 46 of the phase detector transistor 38 is more positive than the potential at the emitter 42, a reverse bias is established between the base 46 and the emitter 42, and conventional current flow in the base-emitter path of the transistor 10 is in the base-to-emitter direction. This is the difficult direction of current flow in the base-emitter path, which presents a relatively high impedance to current so flowing therein. There can, however, be substantially no current flow in the emitter-collector path of a transistor when current flow in the base-emitter path is in the difficult direction.

When, however, the potential at base 46 is more negative than the potential at emitter 42, there is established a forward bias between the base 46 and the emitter 42. The direction of conventional current flow in the base-emitter path of the transistor 38 is thus in the emitter-to-base direction. This is the easy direction of current flow in the base-emitter path, which presents a very low impedance to current so flowing therein. A substantial current may flow in the emitter-collector path of a transistor when current flow in the base-emitter path is in the easy, low impedance direction, the magnitude and direction of the emitter-collector current depending upon the magnitude and polarity of the potential difference between emitter potential and collector potential.

The average D. C. value and the polarity of the D. C. component of the output voltage wave of the transistor 38 will depend upon the difference in phase between the oscillator signal and the burst frequency gate.

When the oscillator signal is in phase with the burst signal gate, a negative half-cycle of the oscillator signal occurs during the same period that a negative half-cycle of the burst signal gate occurs. Thus, during this significant period when the emitter-collector path of the transistor 38 is conductive, current flow in the output of the transistor 38 is unidirectional. The output voltage from the transistor 38 will thus be a full negative half-cycle.

When the oscillator signal lags the burst signal by 90°, equal portions of a positive half-cycle and a negative half-cycle of the output of the oscillator signal occur, in that order, during the significant period when the emitter-collector path of the transistor 38 is conductive. The output waveform will comprise a positive quarter-cycle followed by a negative quarter-cycle, which if integrated over a complete cycle will give an average control current of zero at the base electrodes of the push-pull stage.

When the oscillator signal is 180° out-of-phase with the burst signal, a full positive half-cycle of the oscillator signal occurs during the significant period when the emitter-collector path of the transistor 38 is conductive. The output voltage of the transistor 38 will thus be in the form of a full positive half-cycle.

When the oscillator signal lags the burst signal by 270°, equal portions of a negative half-cycle and a positive half-cycle of the oscillator signal occur, in that order, during the significant period when the emitter-collector path of the transistor 38 is conductive. The output voltage waveform will thus comprise a negative quarter-cycle followed by a positive quarter-cycle.

The nature of the output voltage waveforms for phase relationships intermediate those chosen as examples, may be readily deduced. Thus, if the oscillator signal lags the burst signal by an angle less than 90°, the output voltage waveform comprises unequal portions of successive positive and negative half-cycles, the negative half-cycle portion exceeding in duration the preceding positive half-cycle portion. The ratio of the duration of the positive half-cycle portion to the duration of the negative half-cycle portion increases from zero toward unity as the angle increases from 0° toward 90°.

If the oscillator signal lags the burst signal by an angle less than 180° but greater than 90°, the output voltage waveform comprises unequal portions of successive positive and negative half-cycles, the negative half-cycle portion being shorter in duration than the preceding positive half-cycle portion. The ratio of the duration of the positive half-cycle portion to the duration of the negative half-cycle portion increases from unity toward infinity as the angle increases from 90° toward 180°.

If the oscillator signal lags the burst signal by an angle less than 270° but greater than 180°, the output voltage waveform comprises unequal portions of successive negative and positive half-cycles, the positive half-cycle portion exceeding in duration the preceding negative half-cycle portion. The ratio of the duration of the positive half-cycle portion to the duration of the negative half-cycle portion decreases toward unity as the angle increases from 180° toward 270°.

If the oscillator signal lags the burst signal by an angle greater than 270° but less than 360° (in phase condition), the output voltage waveform comprises unequal portions of successive negative and positive half-cycles, the positive half-cycle portion being shorter in duration than the preceding negative half-cycle portion. The ratio of the duration of the positive half-cycle portion to the duration of the negative half-cycle portion decreases from unity toward zero as the angle increases from 270° toward 360°.

The oscillator portion of the color hold circuit illustrated in Figure 3 operates in much the same manner as a conventional junction transistor oscillator circuit. That is, the parallel resonant circuit 82 which comprises the inductor 78 and the capacitors 87 and 89 determines the operating frequency of the oscillator. Energy is fed back from the collector to the emitter by means of the crystal 96, which provides a frequency-selective feedback path for the oscillator circuit. This feedback energy is provided in phase and magnitude to overcome the losses in the circuit and sustain oscillation.

If the emitter 32 of the oscillator transistor 28 becomes positive, current will flow into the transistor 28. In this manner, there will be a negative charge accumulated on the lower plate of the feedback crystal 96. The negative charge which is left on the lower plate of the crystal 96 can leak off slightly through the radio frequency choke coil 90, but not rapidly enough to keep the amount of conduction on the next positive swing from being less due to the negative bias on the emitter 32. Consequently, the amount of current that flows through the transistor 28 is adjusted by the self-rectifying action of its emitter 32. By connecting the diode 130 across the RF choke coil 90, however, the negative bias voltage on the emitter 32 is able to discharge more rapidly. As a result the emitter 32 is held at the same potential for low frequency operation as the emitters 52 and 62 of the push-pull transistors 48 and 58 respectively.

The potential on the emitters 52 and 62 of the push-pull transistors 48 and 58 respectively is determined by the potential on the base electrodes of these transistors, since the base-to-emitter potential drop is negligible. The base potentials of the push-pull transistors 48 and 58 are, in turn, determined by the potential at the variable tap 102 which is associated with the variable resistor 100. This potential is adjusted such that the emitters 52 and 62 of the push-pull transistors 48 and 58 respectively and consequently the emitter 32 of the oscillator transistor 28, is slightly more positive than the base 36 of the oscillator transistor 28.

As an example of the operation of the complete color hold circuit, it is assumed in accordance with the previous description of the phase detector transistor 38 that the phase relationship between the oscillator signal and the burst signal is such that the output voltage from the transistor phase detector 38 is positive. This positive output voltage will be integrated by the RC filter 112 which comprises the capacitor 114 and the resistor 116 and cause the potentials on the base electrodes 56 and 66 of the push-pull transistors 48 and 58 respectively to go more positive. When this happens, the N–P–N transistor 58 will become more conductive and the potential on the common emitters 52 and 62 will become more positive. Thus, the emitter 32 of the oscillator transistor 28 will become more positive.

If the emitter 32 of the oscillator transistor 28 becomes more positive, the transistor 28 will become more conductive. This will increase the input and output capacities of the transistor 28 in the same manner as described in connection with Figure 2. An increase in the input and output capacities of the transistor 28 will, in turn, decrease the frequency of operation of the oscillator circuit. In this manner, the phase or frequency of the transistor oscillator circuit is varied, in accordance with the invention, to correct for any phase differences that might exist between the information contained in the burst and the output of the oscillator circuit. Thus, in accordance with the invention, a relatively simple yet reliable and efficient transistor circuit is provided for color synchronization applications, which precisely controls the color reference frequency oscillator to be in phase or cophasal with the burst signal.

What is claimed is:

1. The combination with a controlled oscillator circuit including a first semi-conductor device having a first emitter, a first base and a first collector electrode cooperatively associated therewith, the input and output capacity of said device being variable in response to changes in emitter current, and means connected with said device for generating an oscillator signal; of at least one semi-conductor control device including a second emitter, a second base and a second collector electrode cooperatively associated therewith; means for applying control signals to said second base electrode to alter the conductivity of said semi-conductor control device; and means connecting said first emitter electrode with one of said second emitter and collector electrodes whereby the emitter current of said first semi-conductor device is altered in response to changes in the conductivity of said semi-conductor control device to change the input and output capacity of said first device and the frequency of said oscillator signal.

2. In a color television receiver in which received signals include a color synchronization signal, the combination comprising, an oscillator circuit including a first semi-conductor device having a base, an emitter and a collector electrode, and means connected with said device for generating an oscillator signal having a predetermined frequency; a second semi-conductor device; means for impressing said color synchronization signal and said oscillator signal on said second device for developing a resultant control signal; a third and a fourth semi-conductor device connected for push-pull operation and including an input and an output circuit; means for impressing said control signal on said input circuit; and means connecting said output circuit with the emitter electrode of said first semi-conductor device thereby to alter the emitter current of said first device in response to said control signal to change the frequency of said oscillator circuit.

3. A phase-controlled semi-conductor oscillator circuit for color television receiving systems comprising, in combination, a first semi-conductor device having a first base, a first emitter and a first collector electrode; a frequency determining circuit connected with said first collector electrode for providing an oscillator signal having a predetermined frequency, means providing a regenerative feedback path connected between said collector and emitter electrodes, a second semi-conductor device having a second base, a second emitter and a second collector electrode, direct-current conductive means coupling said first emitter electrode with one of said second emitter and collector electrodes, and means for impressing a control signal on said second base electrode to change the current conducting condition of said second device and the emitter current of said first device to thereby change the frequency of said oscillator signal.

4. In a color television receiver in which received signals include a color synchronization signal; an automatic frequency control system comprising: an oscillator circuit including a first semi-conductor device having a base, an emitter and a collector electrode, means for generating an oscillator signal including a frequency determining circuit connected with said collector electrode and feedback means connected between said collector and emitter electrodes; a symmetrical semi-conductor phase detector device including a base electrode and a pair of output electrodes; means connecting said frequency determining circuit with one of said output electrodes for applying said oscillator signal thereto; means for applying said color synchronization signal to the base electrode of said phase detector device, said phase detector device being operative to detect the phase difference between said color synchronization signal and said oscillator signal for developing a control voltage proportional thereto; a second and a third semi-conductor device of opposite conductivity types each of which includes a base, an emitter and a collector electrode; means connecting the base electrode of said second device with the base electrode of said third device; means connecting the emitter electrode of said second device with the emitter electrode of said third device and providing push-pull operation of said second and third devices; means connecting the output electrodes of said phase detector device with the base electrodes of said second and third semi-conductor devices whereby the conductivity of said second and third devices is altered in response to said control voltage; and means including an inductor coupling the junction of the emitter electrodes of said second and third devices with the emitter electrode of said first device thereby to alter the emitter current of said first device in response to changes in the conductivity of said second and third devices to change the input and output capacity of said first device and the frequency of said oscillator signal.

5. An automatic frequency control system as defined in claim 4 wherein said frequency determining circuit includes the parallel arrangement of an inductor and a pair of series connected capacitors and wherein a point intermediate said capacitors is connected with one of the output electrodes of said semi-conductor phase detector device.

6. An automatic frequency control system as defined in claim 4 wherein a unilateral conducting device is connected in parallel with said inductor.

7. In a color television receiver and the like in which received signals include a color synchronization signal; an automatic frequency control system comprising: an oscillator circuit including a first semi-conductor device having a base, an emitter and a collector electrode, and means connected with said device for generating an oscillator signal having a predetermined frequency; a semi-conductor phase detector device for detecting the phase difference between said color synchronization signal and said oscillator signal and developing a control voltage proportional thereto; a second and a third semi-conductor device of opposite conductivity types connected for push-pull operation and including an input and an output circuit; means for impressing said control voltage on said input circuit to alter the conductivity of said second and third devices; and means connecting said output circuit with the emitter electrode of said first semi-conductor device thereby to alter the emitter current of said first device in response to said changes in the conductivity of said second and third devices and change the operating frequency of said oscillator circuit.

8. In combination with an oscillator circuit including a first semi-conductor device having a first emitter, a first base and a first collector electrode cooperatively associated therewith, and means connected with said first device for generating an oscillator signal, at least a second semi-conductor device including a second emitter, a second base and a second collector electrode cooperatively associated therewith, means for applying a signal to said second device to alter the conductivity of said second device, and means connecting said first emitter electrode with one of said second emitter and collector electrodes to alter the emitter current of said first device in response to said changes in the conductivity of said second device and change the frequency of said oscillator signal.

9. In a color television receiver in which received signals include a color synchronization signal; an automatic frequency control system comprising: an oscillator circuit including a first transistor having a base, an emitter and a collector electrode, means for generating an oscillator signal including a parallel resonant frequency determining circuit connected with said collector electrode and feedback means including a crystal collected between said collector and emitter electrodes, a symmetrical phase detector transistor including a base, an emitter and a collector electrode; means connecting said frequency determining circuit with one of said emitter and collector electrodes of said phase detector transistor for applying said oscillator signal thereto; means for applying said color synchronization signal to the base electrode of said phase detector transistor; said phase detector transistor being operative to detect the phase difference between said color synchronization signal and said oscillator signal for developing a control voltage proportional thereto; a second and a third transistor of opposite conductivity types each of which includes a base, an emitter and a collector electrode; means connecting the base electrode of said second device with the base electrode of said third device; means connecting the emitter electrode of said second device with the emitter electrode of said third device and providing push-pull operation of said second and third transistors; means including an integrating network connecting the collector and emitter electrodes of said phase detector transistor with the base electrodes of said second and third transistors whereby the conductivity of said second and third transistors is altered in response to said control voltage; and means including an inductor coupling the junction of the emitter electrodes of said second and third transistors with the emitter electrode of said first transistor to alter the emitter current of said first transistor in response to changes in the conductivity of said second and third transistors and change the input and output capacity of said first device and the frequency of said oscillator signal.

10. A controlled oscillator circuit comprising in combination, a transistor having a base, an emitter and a collector electrode, means connected with said transistor for generating an oscillator signal, and variable impedance control means connected with the emitter electrode of said transistor and operative to alter the emitter current thereof to change the input and output capacity of said transistor and the frequency of said oscillator signal.

11. A phase-controlled semi-conductor oscillator circuit for color television receiving systems comprising, in combination, a first semi-conductor device having a first base, a first emitter and a first collector electrode, a frequency determining circuit connected with said device for providing an oscillator signal, means providing a feedback path connected between said collector and emitter electrodes, a second semi-conductor device having a second base, a second emitter and a second collector electrode, biasing means providing energizing potentials for each of said devices, means coupling said first emitter electrode with said second emitter electrode, and means for impressing a control signal on said second device to change the current conducting condition of said second device and the emitter current of said first device whereby the frequency of said oscillator signal is varied.

12. An oscillator circuit as defined in claim 11 wherein a radio frequency choke coil is serially connected between said first and second emitter electrodes.

13. An oscillator circuit as defined in claim 11 wherein said biasing means includes a variable resistance element connected with said first base electrode.

14. In a color television receiver in which received signals include a color synchronization signal; the combination comprising, an oscillator circuit including a first semi-conductor device having a base, an emitter and a collector electrode, means for generating an oscillator signal including a frequency determining circuit connected with said first semi-conductor device; a second semi-conductor device; means connecting said oscillator circuit with said second semi-conductor device for applying said oscillator signal thereto, means for applying said color synchronization signal to said second semi-conductor device; said device being operative to detect the phase difference between said color synchronization signal and said oscillator signal for developing a control voltage proportional thereto; a third and a fourth semi-conductor device each of which includes a base, an emitter and a collector electrode; means connecting the base electrode of said third device with the base electrode of said fourth device; means connecting the emitter electrode of said third device with the emitter electrode of said fourth device; means connecting said second device with the base electrodes of said third and fourth semi-conductor devices; and means coupling the emitter electrodes of said third and fourth devices with the emitter electrode of said first device to vary the frequency of said oscillator signal to be in phase with said color synchronization signal.

15. The combination with a controlled oscillator circuit including a first junction transistor having a first emitter, a first base and a first collector electrode cooperatively associated therewith, and means connected with said first junction transistor for generating an oscillator signal having a predetermined frequency, of control means including at least a second junction transistor having a second emitter, a second base and a second collector electrode cooperatively associated therewith, means for applying energizing potentials to the electrodes of said first and second transistors, means for applying control signals to said second base electrode to alter the conductivity of said second transistor, and means connecting said first emitter electrode with one of said second emitter or collector electrodes to alter the emitter current of said first transistor in response to changes in the conductivity of said second transistor to change the input and output capacity of said first transistor and the frequency of said oscillator signal.

16. A controlled oscillator circuit comprising in combination, a first semi-conductor device including a first base, a first emitter and a first collector electrode, a parallel resonant circuit coupled with said collector electrode to provide an oscillatory circuit, and means for impressing a reference signal wave on said oscillatory circuit for changing the operating frequency thereof including a second semi-conductor device having a second base, a second emitter and a second collector electrode, means connecting said first emitter electrode with one of said second emitter or collector electrodes, and means for applying control signals to said second device.

References Cited in the file of this patent

UNITED STATES PATENTS

| | | |
|---|---|---|
| 2,460,112 | Wright et al. | Jan. 25, 1949 |
| 2,570,938 | Goodrich | Oct. 9, 1951 |
| 2,663,800 | Herzog | Dec. 22, 1953 |
| 2,666,902 | Koros | Jan. 19, 1954 |

OTHER REFERENCES

"Junction Transistor Equivalent Circuits and Vacuum Tube Analogy" by Giocoletto; pages 1490–1493 of Proc. IRE, vol. 40, No. 11, November 1952.